United States Patent [19]

Kasai et al.

[11] 4,441,765
[45] Apr. 10, 1984

[54] TRACK GUIDE BEARING

[75] Inventors: Shinichi Kasai, Fujimi; Sotoji Nakagawa, Maebashi; Nobuyuki Osawa, Takasaki, all of Japan

[73] Assignee: Nippon Seiko Kabushiki Kaisha, Tokyo, Japan

[21] Appl. No.: 431,701

[22] Filed: Sep. 30, 1982

[30] Foreign Application Priority Data

May 7, 1982 [JP] Japan .............................. 57-65665[U]

[51] Int. Cl.³ .............................................. F16C 29/06
[52] U.S. Cl. ..................................... 308/6 C; 308/3 R
[58] Field of Search ............... 308/6 C, 6 R, 3 A, 3 R

[56] References Cited

U.S. PATENT DOCUMENTS

| | | | |
|---|---|---|---|
| 3,934,946 | 1/1976 | Burr et al. ............................. | 308/6 C |
| 4,312,545 | 1/1982 | Blaurock et al. .................... | 308/6 C |
| 4,390,215 | 6/1983 | Mottate .............................. | 308/6 C |

FOREIGN PATENT DOCUMENTS

| | | | |
|---|---|---|---|
| 2061408 | 5/1981 | United Kingdom ............... | 308/6 C |

*Primary Examiner*—Stuart S. Levy
*Assistant Examiner*—Thomas R. Hannon
*Attorney, Agent, or Firm*—Wyatt, Gerber, Shoup, Scobey & Badie

[57] ABSTRACT

A slide table has two parallel axial ball rolling grooves of Gothic arch-like cross section provided in each of the inclined surfaces of an outwardly opening trapezoidal groove and has axial through-bores providing ball passageways formed rearwardly of the ball rolling grooves. The track shaft has Gothic arch-like ball rolling grooves formed axially thereof and corresponding to the ball rolling grooves of the slide table. Each of the Gothic arch-like ball rolling grooves has a narrow escape groove provided in the bottom thereof. Each of the semicircular ball passageways has a narrow concave groove in the bottom thereof and is in the form of a recess. The retainer comprises a wire rod having a straight portion and semicircularly bent portions extending from the opposite ends of the straight portion. The semicircularly bent portions are engaged with the concave grooves of the side plates. The slide table is supported on the track shaft by four rows of balls which are in four-point contact. The slide table is axially movable through the rolling movement of the balls.

1 Claim, 7 Drawing Figures

TRACK GUIDE BEARING

BACKGROUND OF THE INVENTION

1. Field of the Invention

This invention relates to improvements in a track guide bearing having a number of balls rollably disposed between a ball rolling groove provided axially of an elongate track shaft and an axial ball rolling groove provided in a slide table crowned by the track shaft.

2. Description of the Prior Art

In such a track guide bearing, the slide table is guided through the rolling movement of balls and therefore slide resistance is very small, and the stick scrip phenomenon which is liable to occur to the conventional sliding guide hardly occurs. Also, the balls roll while fitting between the concave grooves of the ball rolling groove and, therefore, such track guide bearing has an advantage that the load capacity is great as compared with that of conventional linear ball bearing. Thus, the track guide bearing has recently become used as the guide element of a machine tool, a measuring instrument or the like, particularly as the guide element of a machine which effects positioning by a pulse motor.

Generally, a carriage apparatus used in a machine tool is great in weight and also the extraneous forces which act thereon may be rather large. Therefore the carriage apparatus of the machine tool requires a track guide bearing of great load capacity and great rigidity, but the conventional track guide bearing has suffered from the disadvantage that it is low in the capability of supporting a high load.

Typical track guide bearings of the prior art will hereinafter be described by reference to FIGS. 6 and 7 of the accompanying drawings.

This track guide bearing is bilaterally symmetric with respect to a vertical axis of symmetry and therefore, FIG. 6 is a fragmentary longitudinal cross section showing only the right upper portion of the track guide bearing.

In the right upper portion of a track shaft 1, arcuate ball rolling grooves 2 and 3 are axially formed in the upper surface and the side surface. In the inner surface of the right upper portion of a slide table 4, ball rolling grooves 5 and 6 corresponding to the ball rolling grooves 2 and 3, respectively, of the track shaft are formed on the opposite sides of a U-shaped groove 7. A number of balls 8 and 9 are rollably fitted between the corresponding grooves of the ball rolling grooves 5, 6 of the slide table and the ball rolling grooves 2, 3 of the track shaft.

In this track guide bearing, the balls 8 and 9 are in contact with the ball rolling grooves 2, 5 or 3, 6 at two points, and the lines of contact intersect each other at a point P. In such a construction, most of the forces acting vertically downwards from the slide table are supported by the upper balls 8 of the track shaft, and the lower balls 9 hardly support these forces. As regards the forces in the upwards direction tending to raise the slide table, these forces are supported by the lower balls 9, and the upper balls 8 are in idle condition. As regards the lateral forces which act on the slide table, the lower balls 9 support almost all of such forces and the upper balls 8 hardly support such forces. Accordingly, the track guide bearing of the prior art having two rows of balls disposed at the left and right corners has utilized only the supporting capability of one row of balls and thus, has been low in load supporting capability.

In another form of the conventional track guide bearing shown in FIG. 7, the load supporting capability is low as in the track guide bearing of FIG. 6. That is, ball rolling grooves 12 and 13 of arcuate cross section are formed at the opposite corners of a ridge provided in the side surface of a track shaft 11. Ball rolling grooves 15 and 16 corresponding to the ball rolling grooves 12 and 13, respectively, of the track shaft are formed in the inner side surface of a slide table 14, and a number of balls 18 and 19 are rollably fitted between these corresponding ball rolling grooves 12, 15 and 13, 16. In this track guide bearing, the lines of contact of the balls 18, 19 intersect each other at a point Q, and the lower balls 19 are idle relative to the vertically downward force which act on the slide table 14 and the upper balls 18 are idle relative to the forces in the direction of raising the slide table and therefore, the load supporting capability is low.

In this track guide bearing of FIG. 7, the load supporting capabilities in the direction of raising and the lateral direction are improved over those in the track guide bearing of FIG. 6, but the track guide bearing of FIG. 7 has a supporting capability of only about 70% for the vertically downwardly acting force.

SUMMARY OF THE INVENTION

The present invention has been made to improve the low load capacity of the above-described track guide bearings of the prior art and an object thereof is to provide a track guide bearing which is compact in construction and yet great in load capacity and rigidity and excellent in operability.

To achieve such object, according to the present invention, two ball rolling grooves formed in the inclined surfaces of a trapezoidal groove provided in a slide table and ball rolling grooves formed in a track shaft correspondingly to the ball rolling grooves of the slide table are made into Gothic arch-like grooves, and balls are selected so that the balls fitted make four-point contact between the corresponding ball rolling grooves.

The invention will become more fully apparent from the following detailed description thereof taken in conjunction with the accompanying drawings.

DESCRIPTION OF THE PREFERRED EMBODIMENTS

Figure 1:
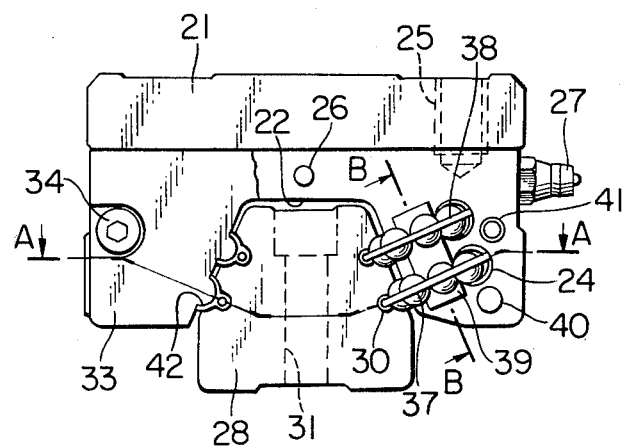
FIG. 1 is a front view showing an embodiment of the track guide bearing according to the present invention and wherein a portion of a side plate 33 which is a part of the track guide bearing has been removed.
Figure 2:
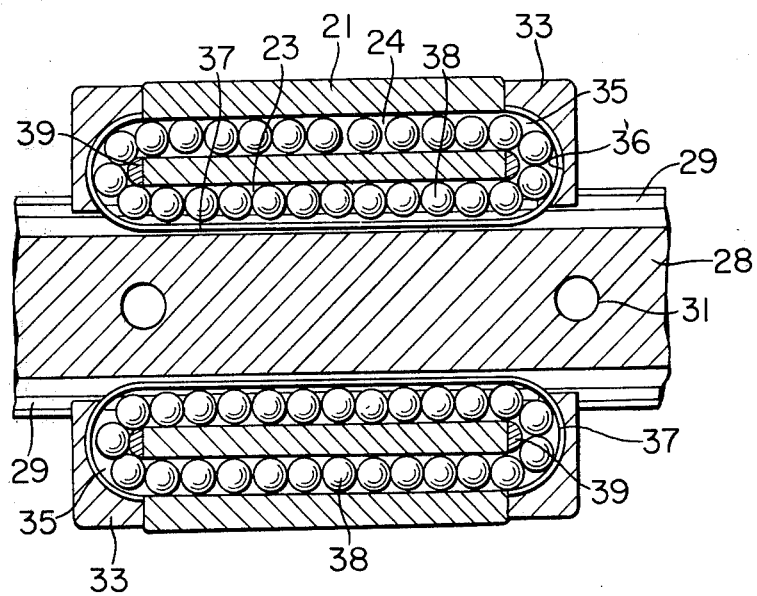
FIG. 2 is a transverse cross-sectional view taken along line A—A of FIG. 1.
Figure 3:
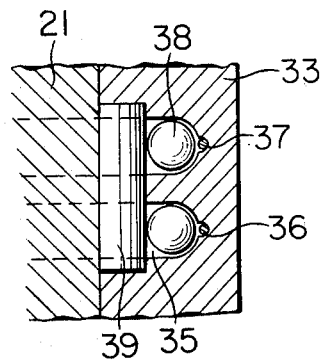
FIG. 3 is a fragmentary cross-sectional view taken along line B—B of FIG. 1.

An embodiment of the track guide bearing according to the present invention will hereinafter be described with reference to FIGS. 1 to 5.

A slide table 21 is a square-shaped block having a downwardly opening trapezoidal groove 22 formed over the axial full length threeof. Two ball rolling grooves 23 of Gothic arch-like cross section (two-point contact type grooves) are formed in the opposite inclined side surfaces of the trapezoidal groove 22, and four ball rolling grooves 23 formed in the slide table 21 are parallel to one another.

Rearwardly of the ball rolling grooves 23 of the slide table, there are formed through-bores 24 which provide ball passageways parallel to the ball rolling grooves 23.

In the upper surface of the slide table 21, there are formed four screw holes 25 for mounting the slide table 21 to another member when the track guide bearing is used. A bore 26 is a lubricating grease passageway opening in the end surfaces of the slide table 21, and grease may be supplied from a grease nipple 27 provided on one side surface of the slide table.

An elongate track shaft 28 having in its upper part a trapezoidal portion fitted in the trapezoidal groove 22 of the slide table with a slight clearance interposed therebetween has in its inclined side surfaces axial ball rolling grooves 29 of the slide table, the cross section of each ball rolling groove 29 being in the form of a Gothic arch. A narrow escape groove 30 is formed in the bottom of each ball rolling groove 29 of the track shaft.

Holes 31 formed in the track shaft 28 are bolt holes for mounting the track shaft 28 to another member when the track guide bearing is used.

The slide table 21 is of a shape having overhang portions 32 at the upper parts of the opposite ends thereof, and side plates 33 slightly thinner than the length of the overhang portions 32 are fixed to the portions below the overhang portions 32 by bolts 34. Each of these side plates 33 has a trapezoidal cut-away complementary to the trapezoidal groove 22 of the slide table. In the surface of each side plate 33 which bears against the end surface of the slide table 21, a semicircular ball passageway 35 extending astride of the ball rolling groove 23 and the through-bore 24 of the slide table is formed as a recess, and a narrow concave groove 36 is formed in the bottom of the ball passageway 35.

A retainer 37 comprising a wire rod consisting of a straight portion and semicircularly bent portions extending from the opposite ends of the straight portion is held with the semicircularly bent portions engaged in the concave grooves 36 of the side plates fixed to the opposite ends of the slide table 21.

A number of balls 38 are rollably disposed in an elliptical ball circulation path formed by the ball rolling grooves 23 and the through-bores 24 of the slide table and the semicircular ball passageways 35 of the side plates. Even in a condition in which the track shaft 28 is not assembled to the track guide bearing, these balls 38 are prevented from falling off by the straight portion of the retainer 37 coming close to the ball rolling grooves 23 and are capable of being guided and circulated by the retainer 37.

Figure 4:
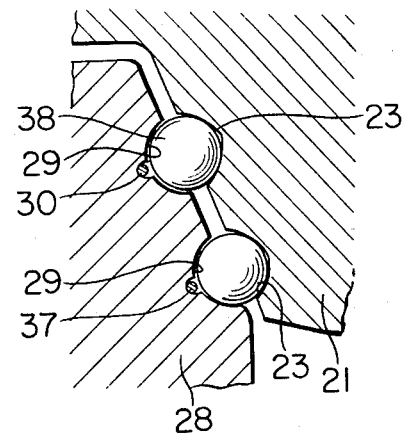
FIG. 4 is a longitudinal cross-sectional view showing the fitted condition of the balls of the track guide bearing.
Figure 5:
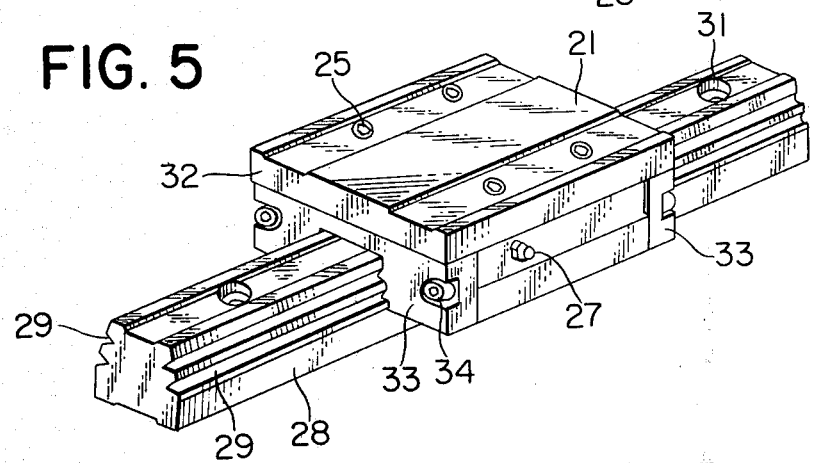
FIG. 5 is a perspective view of the FIG. 1 track guide bearing.

In this track guide bearing, all of the cross sections of the ball rolling grooves 23 and 29 are formed in Gothic arch-like shape and, as shown in enlargement in FIG. 4, both the upper and the lower balls make four-point contact. In order that all balls may make four-point contact, the track shaft 28 and the slide table 21 are assembled together by selecting such a ball diameter measured after machining of the ball rolling grooves 23 and 29 as will provide a desired pre-pressure, and since slight elastic deformation can be allowed for in the balls 38, each row of balls 38 can be designed to make four-point contact.

A piece 39 disposed between each end surface of the slide table 21 and each side plate 33 has a semicircular cross section and is engaged in a recess formed in the side plate 33 so as to straddle the semicircular ball passageway 35 of the side plate.

This piece 39 guides from inside the balls 38 moving along the semicircular ball passageway 35 of the side plate.

The slide table 21 having the balls 38 incorporated therein is fitted onto the track shaft 28 so that the balls 38 fit in the ball rolling grooves 29 of the track shaft, and is axially movable through the rolling movement of the balls.

The escape groove 30 provided in the bottom of each ball rolling groove 29 of the track shaft is for receiving the retainer 37 which holds the balls 38.

Holes 40 formed in the end surfaces of the slide table 21 are positioning holes for engaging the corresponding projections of the side plates therewith and positioning the side plates 33.

A screw hole 41 is shown on the right-hand side of FIG. 1 and, since FIG. 1 is a view in which the right-hand side of the side plates 33 is removed, a screw hole for a bolt 34 for attaching the side plate 33 is seen.

Each side plate 33 is provided with projections 42 of semicircular cross-sectional shape entering into the ball rolling grooves 29 of the track shaft, and the holding length of the semicircularly bent portions of the retainer 37 is prolonged by these projections 42 to ensure the retainer to be reliably held.

Figure 6:
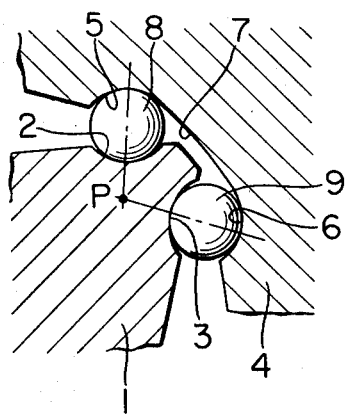
FIGS. 6 and 7 are cross-sectional views showing the fitted condition of the balls of the track guide bearings according to the prior art.
Figure 7:
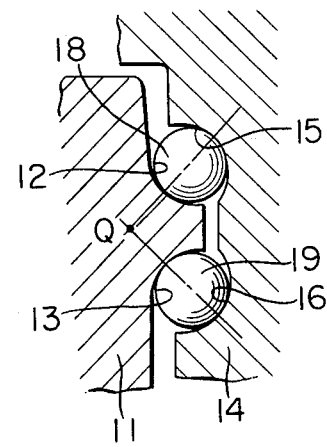

In the track guide bearing of the present invention constructed as described above, the balls are guided and smoothly circulated by the retainer comprising a wire rod having semicircular ends engaged with the bottoms of the semicircular ball passageways of the side plates, and the two ball rolling grooves formed in the inclined surfaces of the trapezoidal groove provided in the slide table and the ball rolling grooves of the track shaft corresponding to the ball rolling grooves of the slide table are made into Gothic arch-like grooves, and the balls are incorporated in a condition in which a pre-pressure is imparted thereto and therefore, the track guide bearing is excellent in operability and there is no ball which becomes idle for sustaining the vertically downward or upward force. As compared with the conventional track guide bearing of FIG. 6, in a case where balls of the same dimensions are used, the track guide bearing of the present invention has a dynamic load capacity of 1.3 times for the vertically downwardly acting load, a dynamic load capacity of 1.5 times for the vertically upwardly acting load, and a dynamic load capacity of 2 times for the lateral load, and as viewed from the viewpoint of service life, which is proportional to the cube of the dynamic load capacity, the track guide bearing of the present invention has a service life of 2.2 times for the vertically downwardly acting load, a service life of 3.4 times for the vertically upwardly acting load, and a service life of 8 times for the lateral load.

The amount of elastic displacement for rigidity, i.e., load, assumes a different value depending on the acting load since the contact displacement of the balls is proportional to $\frac{2}{3}$ power of the load, but in the high load area of the vertically downwardly acting load, rigidity of 1.5 times is obtained as compared with the prior art.

Also, the present invention can provide a track guide bearing which is compact and strong against the moment load because the two ball rolling grooves provided in the slide table are formed in the inclined side surfaces of the trapezoidal groove, and since the two ball rolling grooves can be formed at the same time by the use of two grind stones of large diameter, the present invention mass produced with an excellent efficiency and track guide bearings of good dimensional accuracy can be manufactured at low cost.

What we claim is:

1. A track guide bearing provided with a slide table having two parallel axial ball rolling grooves of Gothic arch-like cross section provided in each of the inclined side surfaces of an outwardly opening trapezoidal groove and having axial through-bores providing ball passageways formed rearwardly of said ball rolling grooves, an elongate track shaft having Gothic arch-like ball rolling grooves formed axially thereof and corresponding to the ball rolling grooves of said slide table, each of said Gothic arch-like ball rolling grooves having a narrow escape groove provided in the bottom thereof, side plates fixed to the opposite ends of said slide table and having semicircular ball passageways extending astride of the ball rolling grooves of said slide table and the through-bores corresponding thereto, each of said semicircular ball passageways having a narrow concave groove in the bottom thereof and having formed as a recess, a retainer comprising a wire rod having a straight portion and semicircularly bent portions extending from the opposite ends of said straight portion, said semicircularly bent portions being engaged with the concave grooves of said side plates, and a number of rollable balls disposed between the ball rolling grooves of said slide table and the ball rolling grooves of said track shaft and in the through-bores of said slide table and the ball passageways of said side plates, said balls being selected so as to be capable of fitting in four-point contact condition between the ball rolling grooves of said slide table and the ball rolling grooves of said track shaft opposed thereto, said slide table being supported on said track shaft by four rows of balls which are in four-point contact, said slide table being axially movable through the rolling movement of said balls.

* * * * *